(12) United States Patent
Soltani Bozchalooi (10) Patent No.: US 11,126,190 B2
(45) Date of Patent: Sep. 21, 2021

(54) LEARNING SYSTEMS AND METHODS

(71) Applicant: Ford Global Technologies, LLC., Dearborn, MI (US)

(72) Inventor: Iman Soltani Bozchalooi, Sacramento, CA (US)

(73) Assignee: FORD GLOBAL TECHNOLOGIES LLC, Dearborn, MI (US)

( * ) Notice: Subject to any disclaimer, the term of this patent is extended or adjusted under 35 U.S.C. 154(b) by 305 days.

(21) Appl. No.: 16/275,145

(22) Filed: Feb. 13, 2019

(65) Prior Publication Data

US 2020/0257302 A1  Aug. 13, 2020

(51) Int. Cl.
*G05D 1/02* (2020.01)
*G06N 20/00* (2019.01)
*G05D 1/00* (2006.01)

(52) U.S. Cl.
CPC ......... *G05D 1/0221* (2013.01); *G05D 1/0088* (2013.01); *G06N 20/00* (2019.01); *G05D 2201/0213* (2013.01)

(58) Field of Classification Search
CPC .. G06N 3/00; G06N 3/02; G06N 3/04; G06N 3/0454; G06N 3/08; G06N 3/082; G06N 3/088; G06N 20/00; G06N 20/10; G06N 20/20; G05D 1/02; G05D 1/0221; G05D 1/0223; G05D 1/0231; G05D 1/0246; G05D 1/0278; G05D 1/0088; G05D 13/00; G05D 2201/0213; G05D 1/0274; G05D 1/0238; B60W 10/00; B60W 60/00276; B60W 2300/00; B60W 2530/213; B60W 2540/041; B60W 2540/049; B60W 2552/00; B60W 2556/65; B60W 2710/00; B60W 2720/406; B60W 2754/00; B60W 2900/00; G06K 9/6271; G06K 9/00818; G06K 9/6227; G06K 9/00805
USPC ......................................................... 701/23
See application file for complete search history.

(56) References Cited

U.S. PATENT DOCUMENTS

| | | | |
|---|---|---|---|
| 6,128,606 A | 10/2000 | Bengio | |
| 6,353,814 B1* | 3/2002 | Weng | G05B 13/0265 700/258 |
| 9,104,186 B2 | 8/2015 | Sinyavskiy | |
| 9,390,372 B2 | 7/2016 | Modha | |
| 2017/0220949 A1 | 8/2017 | Feng | |
| 2017/0256254 A1 | 9/2017 | Huang | |
| 2018/0232663 A1 | 8/2018 | Ross | |

FOREIGN PATENT DOCUMENTS

WO  WO-2018140969 A1  8/2018

OTHER PUBLICATIONS

Beyond Fine Tuning: A Modular Approach to Learning on Small Data.

* cited by examiner

Primary Examiner — Anthony R Jimenez
(74) Attorney, Agent, or Firm — David R. Stevens; Stevens Law Group (57) ABSTRACT

Example learning systems and methods are described. In one implementation, a machine learning system accesses data associated with a particular task and accesses data associated with an overall network. The machine learning system also accesses reward data. The machine learning system then operates on the data associated with a particular task, the data associated with an overall network, and the reward data to perform the particular task.

14 Claims, 7 Drawing Sheets

LEARNING SYSTEMS AND METHODS

TECHNICAL FIELD

The present disclosure relates to learning systems and methods, such as machine learning systems and methods that have a modular neural network structure.

BACKGROUND

Deep learning systems are used in a wide range of applications that include visual perception, such as object recognition, speech recognition, and language understanding. In some situations, the deep learning systems rely on end-to-end solutions where a complex multi-layer network undertakes multiple responsibilities to perform a single task. In a particular example, an end-to-end deep learning system receives sensory information, such as visual data, as input and generates steering, acceleration, and deceleration commands based on the visual data. The training data in this example may include driving policies provided by expert drivers.

In other situations, the deep learning systems use a modular solution where each component of the network is responsible for a specific task. In an autonomous driving example, using the modular approach, each neural network component is responsible for a specific task, such as pedestrian detection, traffic sign detection, or steering command.

These two approaches (the end-to-end approach and the modular approach) have advantages and disadvantages. For example, the modular approach is often easier to troubleshoot than the end-to-end approach. But, the end-to-end approach is capable of self-improvement using reinforcement learning.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

In the following disclosure, reference is made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter is described in language specific to structural features and/or methodological acts, it is to be understood that the subject matter defined in the appended claims is not necessarily limited to the described features or acts described herein. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed herein may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure are directed to computer program products comprising such logic (e.g., in the form of software) stored on any computer useable medium. Such software, when executed in one or more data processing devices, causes a device to operate as described herein.

As mentioned above, both the end-to-end and the modular approaches to the application of deep learning systems (e.g., deep neural networks) have advantages and disadvantages. For example, a modular network structure is easier to troubleshoot and debug as various modules can be tested in isolation and their performance can be monitored independently of one another. Upon the detection of a defective module, improvements in the module network structure or the training data can help mitigate the problem. Additionally, with a modular framework, a particular module can be improved when new training data specific to that particular module is available.

In some embodiments, multiple training datasets are shared within the machine learning community and are growing steadily. For example, upon the availability of additional training data for pedestrian detection, the related module can be further trained and/or fine-tuned for more reliable performance. Another benefit of a modular approach is the flexibility to accommodate conventional techniques that have evolved over the years and have proven efficient and reliable in various applications. For example, consider an autonomous driving task and a lane change sub-task. Based on the existing body of knowledge on classical control, a lane change can be defined in the form of a conventional control problem, incorporating vehicle dynamics, where robust solutions with known safety exist. For this purpose, the output of various deep learning modules, such as object detection or velocity estimation, are fed to a conventional lane change control scheme. This hybrid application of novel machine learning schemes and conventional control methods can provide powerful solutions that simultaneously provide the needed performance and robustness.

Typically, an end-to-end approach does not benefit from these characteristics of a modular network. Most importantly, an end-to-end network structure is difficult or impossible to troubleshoot or debug. In the case of a malfunction, it is difficult or impossible to isolate the responsible portion of the network and subsequently it is difficult to mitigate the problem. In addition, end-to-end solutions tend to have unique training data, specific to the available hardware. Thus, it is difficult for the machine learning community to share end-to-end training data between different hardware platforms. This is a significant limitation since the need for large training datasets necessitates cooperation and data sharing within the community. Additionally, end-to-end structures do not typically have the possibility of benefitting from the conventional means such as robust and optimal control. In many embodiments, an end-to-end architecture follows an all-or-none policy, either providing a complete solution, tackling all aspects of the given problem from perception to control, or failing to provide a solution.

Despite the above-mentioned limitations of an end-to-end approach, it benefits from an important advantage over the modular schemes. An end-to-end structure has the capability of self-improvement through reinforcement learning. For example, consider a robotics task where the only feedback to the system over each step is the objective value (i.e., cost). An end-to-end network can utilize such information and tune the network parameters as it interacts with the environment in order to reduce overall performance costs (or increase rewards). However, modular networks typically lack this capability and cannot benefit from reinforcement learning schemes while maintaining their modular character. For example, consider a deep network responsible for controlling a robotic arm and with two modules placed in series. The first module is a state estimation module which receives available visual data and generates an estimate of position and velocity of various objects. The second module commands various robot servos based on the estimated states determined by the first module. By applying reinforcement learning to such a network, all the corresponding parameters, including those of both the state estimation and control command generation, will be tuned to maximize return or minimize cost. Thus, the modular aspect of the network structure will be lost during training. This happens because a limitation in the control network might in fact force re-tuning of the state estimation module and vice versa, with each module compensating for the limitations of the other, subsequently dissolving the module boundaries. A similar situation happens when the training data is formed by end-to-end input/output pairs.

The systems and methods described herein support the use of a modular network structure that simultaneously benefits from reinforcement as well as other types of training data such as those of an end-to-end training or reinforcement learning approach. These systems and methods efficiently use the available data for best learning performance, regardless of the source of the training information. As described herein, implementations of the systems and methods can benefit from all of the advantages of modular and end-to-end network structures, while using any source of training data to improve the performance of the system in which a selected number of tasks are implemented via a deep learning scheme. The described systems and methods provide a framework that enables preservation of modular network structures in the context of supervised or reinforcement learning. These systems and methods operate regardless of the nature of the available training data and regardless of whether it is module/task specific or end-to-end.

In some embodiments, the described systems and methods are associated with autonomous vehicles or autonomous driving systems. In these embodiments, several modules need to work in coordination with one another to perform the task. For example, some modules may deal with the detection of objects (detection of pedestrians, vehicles, bicycles, traffic signs, and the like) while others are responsible for depth estimation, drivable space detection, steering control, and the like. The systems and methods described herein enable various modules to continue to improve upon their performance by monitoring, for example, the behavior of an expert driver or a large number of expert drivers through the cloud. The information provided by an expert driver is end-to-end in the sense that it only contains the input (e.g., visual data) and the overall system output provided by the expert (e.g., steering command), while disregarding the intermediate steps such as traffic sign detection. In this example, the systems and methods enable each intermediate autonomous driving module to extract the relevant information from the provided end-to-end training data in order to improve upon its performance.

In another example, consider a robotic arm used for the assembly of certain components. Such a system may rely on several modules for landmark detection, state estimation, servo control, and the like. These modules can be designed and/or trained initially, then, during normal operation a robotic assembly system can continue to improve upon its performance by continuously monitoring and subsequently reducing the cycle time. In some embodiments, the only available source of information for further training is the overall reward (cycle time or the equivalent cost in this case). In these embodiments, the systems and methods enable various modules to maintain and improve upon their predefined task.

In some embodiments, the described systems and methods include a machine learning system having a modular neural network structure. The system also has an end-to-end learning and reinforcement learning capability. The system includes multiple primary modules connected in series/parallel. Each of these primary modules are configured to perform a specific task such as detecting the position of vehicles in neighboring lanes and estimating another vehicle's relative velocity. The system also includes an auxiliary module connected in parallel to each primary module to complement the performance of the primary modules. Both modules are trained using three types of training data: a) input/output data associated with a specific task, b) input/out data associated with the overall network (also known as the end-to-end training data), and c) reward/cost feedback to the network often utilized as part of a reinforcement learning framework.

In particular implementations, the primary modules are trained based on data type (a) and auxiliary modules are trained based the training data types (b) and (c). The system may calculate a degree of participation (e.g., uncertainty) of each module in learning new training data which is proportional to its confidence over the new training data. The system quantifies each modules' confidence and uses uncertainty gain networks to decide which module will need to readjust its parameters to reduce the overall error observed by the whole network. The system enables preservation of modularity of network in the context of supervised or reinforcement learning and regardless of the nature of the available training data whether it is module/task specific or end-to-end.

Figure 1:
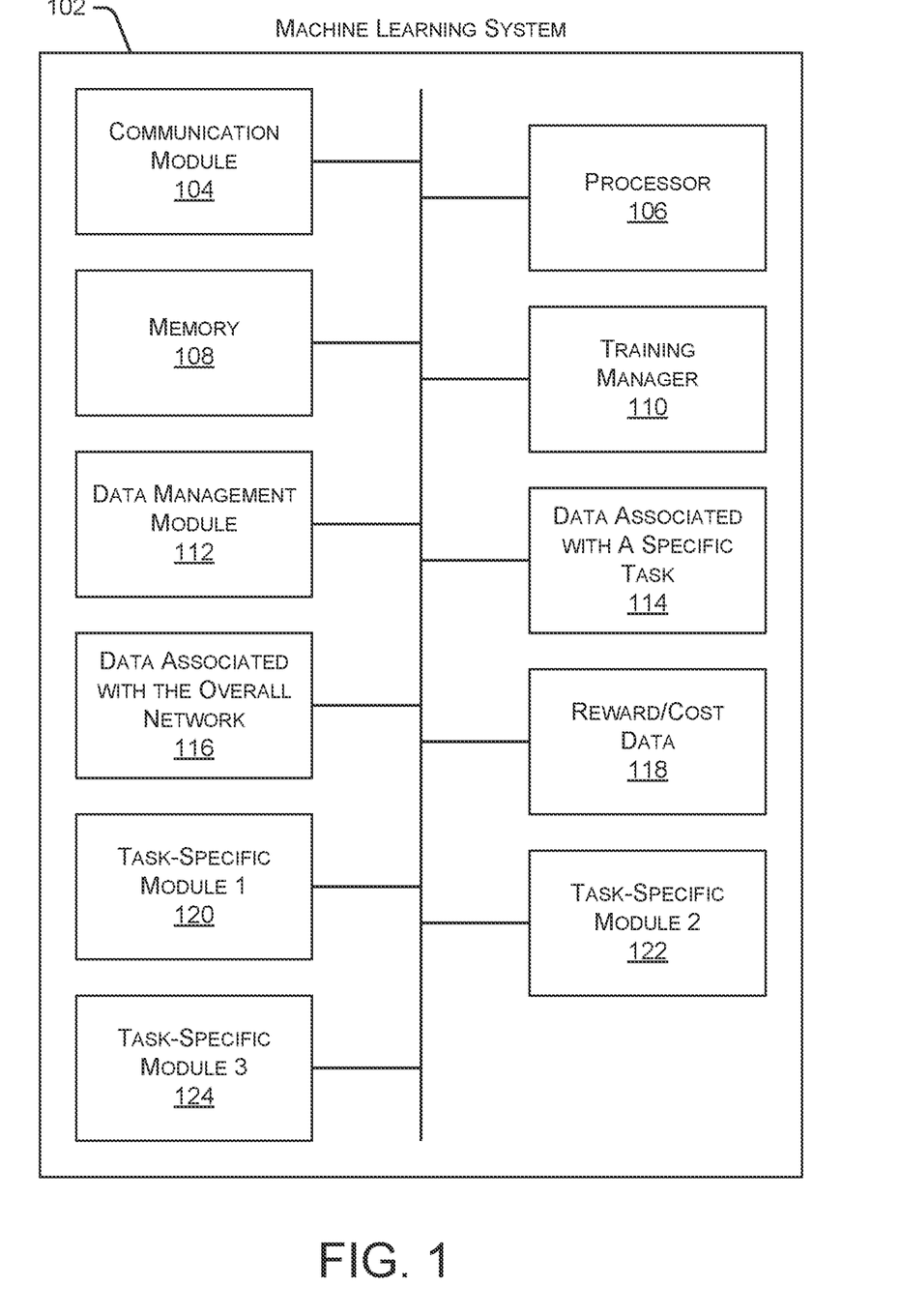
FIG. 1 is a block diagram illustrating an embodiment of a machine learning system.

FIG. 1 is a block diagram illustrating an embodiment of a machine learning system 102. As shown in FIG. 1, machine learning system 102 includes a communication module 104, a processor 106, and a memory 108. Communication module 104 allows machine learning system 102 to communicate with other systems and devices. Processor 106 executes various instructions to implement the functionality provided by machine learning system 102, as discussed herein. Memory 108 stores these instructions as well as other data used by processor 106 and other modules and components contained in machine learning system 102.

A training manager 110 coordinates the training of various modules and systems as discussed herein. A data management module 112 handles various data management tasks, such as receiving data, storing data, and communicating data to modules and systems. Machine learning system 102 receives, accesses, and stores different types of data including data associated with a specific task 114, data associated with the overall network 116, and reward/cost data 118. Machine learning system 102 also includes multiple task-specific modules 120, 122, and 124. Although three task-specific modules 120-124 are shown in FIG. 1, alternate embodiments of machine learning system 102 may include any number of task-specific modules.

Figure 2:
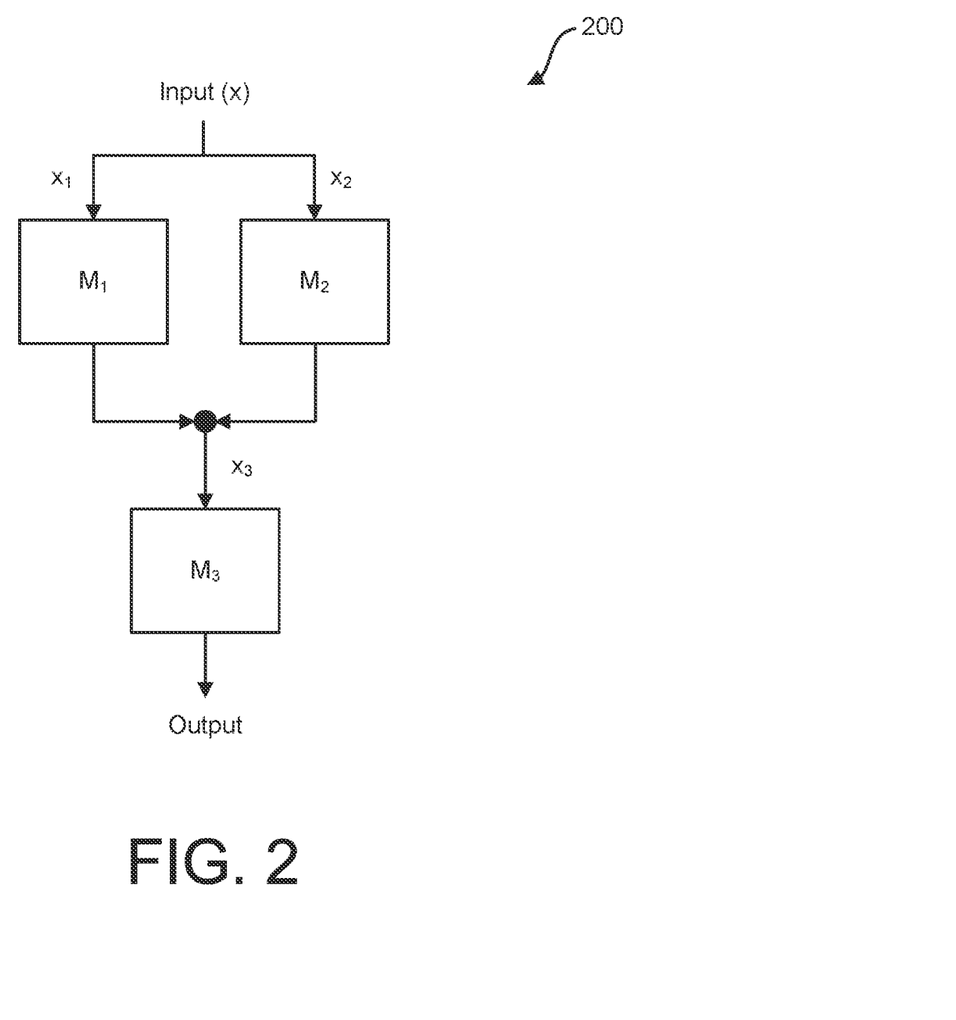
FIG. 2 illustrates an embodiment of a modular network with three primary modules.

FIG. 2 illustrates an embodiment of a modular network 200 with three primary modules labeled $M_1$, $M_2$, and $M_3$. Modular network 200 has two primary input modules, $M_1$ and $M_2$, that work in parallel to form the required inputs of a primary output module, $M_3$, down the stream. The task associated with each module is known apriori and each is trained using the available training data on the specific tasks of interest for those modules. In the example of FIG. 2, modular network 200 is responsible to control an automated system such as an autonomous vehicle or a robotic arm. In a robotic assembly task, for example, $M_1$ receives visual data and extracts position information about a target component. $M_2$ receives visual data and generates speed estimation of various objects in the environment. $M_3$ receives position and velocity information from $M_1$ and $M_2$ and subsequently generates control commands to the servos of the robotic arm. In another example, $M_1$ detects a position of vehicles in the neighboring lanes and the lane markings while $M_2$ estimates other vehicles' relative velocity. $M_3$ generates steering and acceleration/deceleration commands in response to the velocity/position information provided by $M_1$ and $M_2$ for the lane change.

In some embodiments, there are three possible sources of network training data. The first source of network training data includes data containing example input/output pairs for $M_1$ or $M_2$. In the case where $M_1$ is responsible for detecting the position of other vehicles, the training data may include pairs of captured image and the ground truth position of the vehicles in the captured image. In the case where $M_2$ is responsible for estimating the velocity of nearby vehicles, the training data may contain image data paired with the ground truth speed of the vehicles within the images.

A second source of network training data includes data containing example input/output pairs for the network as a whole. In the autonomous driving example mentioned above, the input data may include images and the output contains the desired steering and acceleration/deceleration control commands (e.g., provided by an expert driver).

A third source of network training data includes data containing reward or cost information, where the performance of the network is quantified on each step by assigning a cost or value to various states and a reward to each action. Such information can be utilized for network training as part of a reinforcement learning framework.

In some embodiments, the described systems and methods enable application of all three available training data sources mentioned above, while maintaining the modularity of the network, in which every module corresponds to a specific task. The systems and methods enable each module to extract the information relevant to its specified task (which is assigned through a pre-training step) from the given training data of the types discussed above.

The first source of network training data treats each module independently and hence naturally enforces the modularity of the network. However, the second and third sources of network training data, given their end-to-end nature, tend to dissolve module boundaries. The main question upon the availability of such sources is how to adjust the parameters of each module such that each module continues to improve upon its assigned task.

In a particular example, assume a limiting case where $M_1$ in the example structure of FIG. 2 has already reached the global optima, meaning that the parameters of $M_1$ do not require any further tuning. Given new training data of the types from the second and third sources, ideally one should keep the parameters of $M_1$ intact and only back-propagate the observed errors through $M_2$ and $M_3$. In other words, back-propagation is only applied through those modules that need additional training and leaves the other (already trained) modules intact.

In the described systems and methods, one may generalize the above point of view beyond the above binary example (where each module either participates in learning or disregards the new training data) to a case where the degree of participation of each module in learning is proportional to its confidence related to the new training data. For example, given a new set of training data, each module quantifies its own confidence in generating reliable outputs, given the inputs of the training data. Upon quantification of the modules' confidence, one or more uncertainty gain networks decide on the extent to which each module will readjust its parameters to reduce the overall error observed by the network as a whole.

Although the systems and methods described herein are described with respect to an example network structure, these systems and methods can be applied to any type of network structure. FIG. 2 represents one example network structure. In other embodiments, any variation may be implemented. For example, the embodiment of FIG. 2 may have more than two subsequent steps. FIG. 2 shows M1 and M2 operating in parallel in the same step and M3 is performed downstream at a second stage. The alternate embodiment can have multiple steps where each step has multiple independent modules (instead of M1 and M2, the embodiment can have M1 . . . Mn).

Figure 3A:
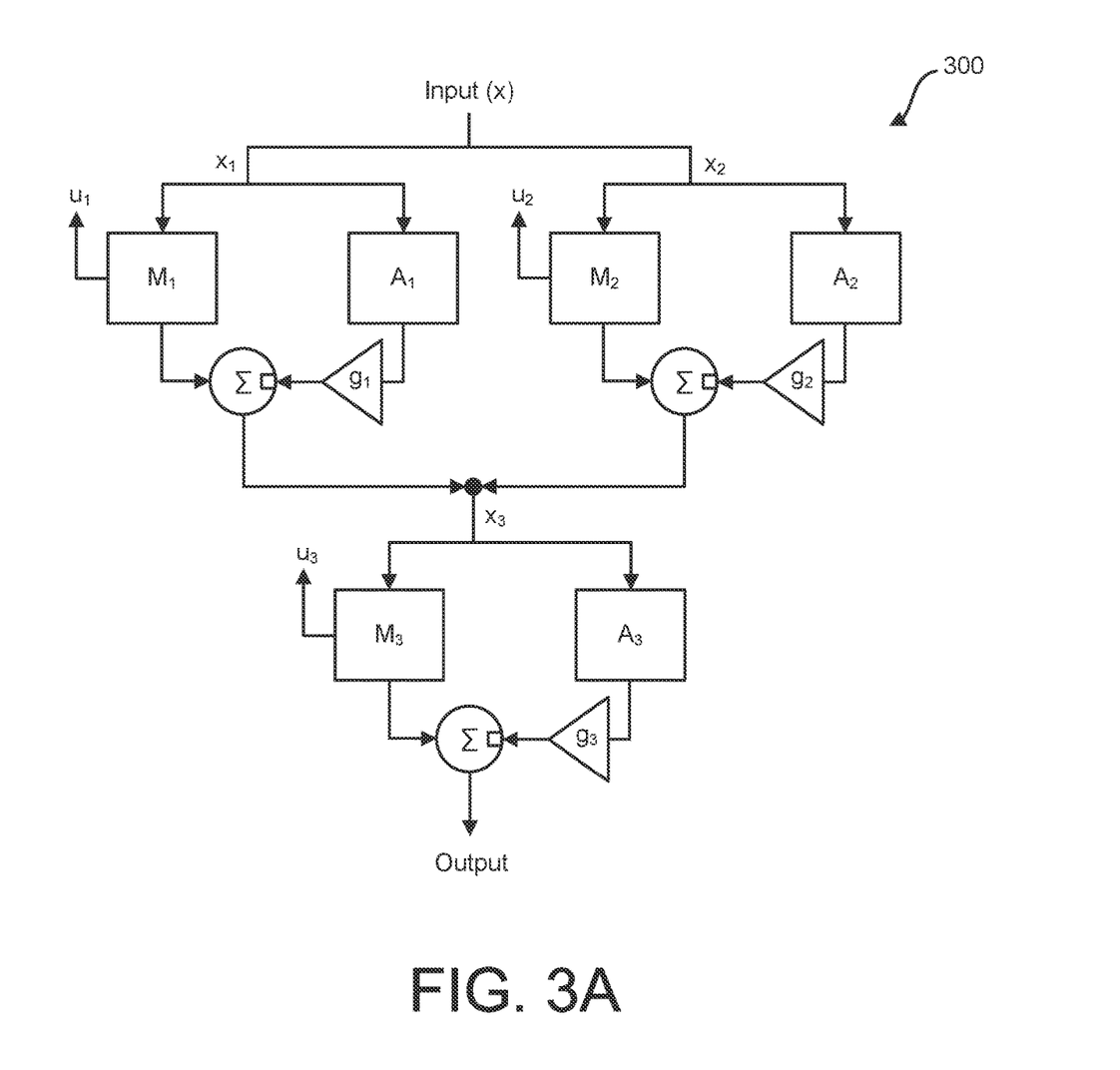
FIG. 3A illustrates an embodiment of a modular network with three primary modules and three auxiliary modules.
Figure 3B:
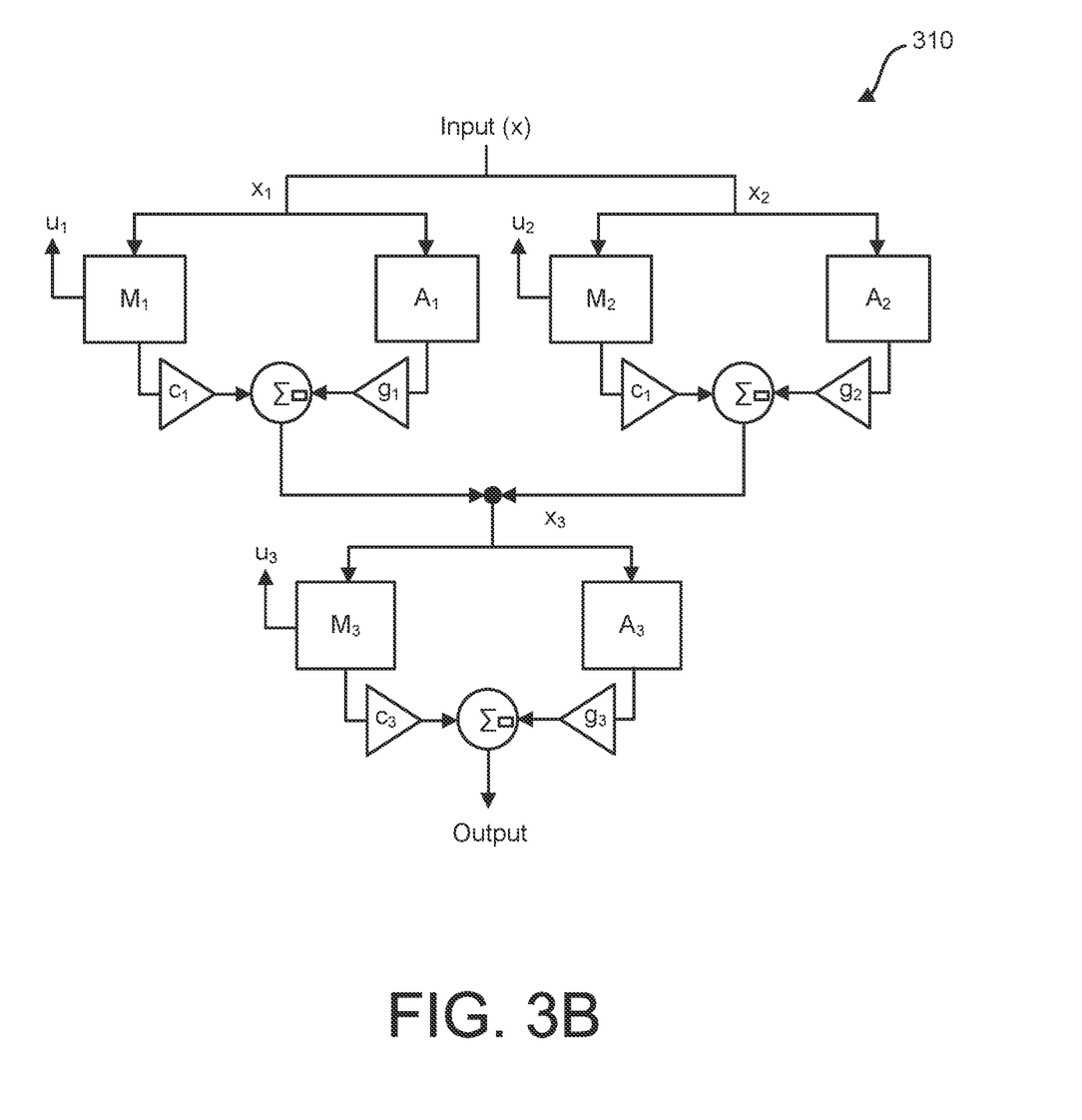
FIG. 3B illustrates another embodiment of a modular network with three primary modules and three auxiliary modules.

FIGS. 3A and 3B illustrate embodiments of modular networks 300 and 310 with three primary modules (or nodes) and three auxiliary modules (or nodes). Modular networks 300 and 310 illustrate the concepts used in the described systems and methods through the structure example of FIG. 2. The examples of FIGS. 3A and 3B clarify the methods and concepts described herein. Alternate embodiments may use different network structures.

As shown in FIGS. 3A and 3B, each of the primary modules, $M_1$ through $M_3$, are complemented by parallel auxiliary modules $A_1$, $A_2$, and $A_3$. In this structure, the parameters of each of the primary modules $M_1$ through $M_3$ are only tuned/retuned based on the first source of network training data. However, auxiliary modules $A_1$ through $A_3$ utilize training data of the second and third sources of network training data for learning and complement the performance of the primary modules $M_1$, $M_2$, and $M_3$ for any behavior that is not captured by the these modules. The output of both the primary and auxiliary modules are scaled by uncertainty gains $c_n$ and $g_n$.

Figure 4A:
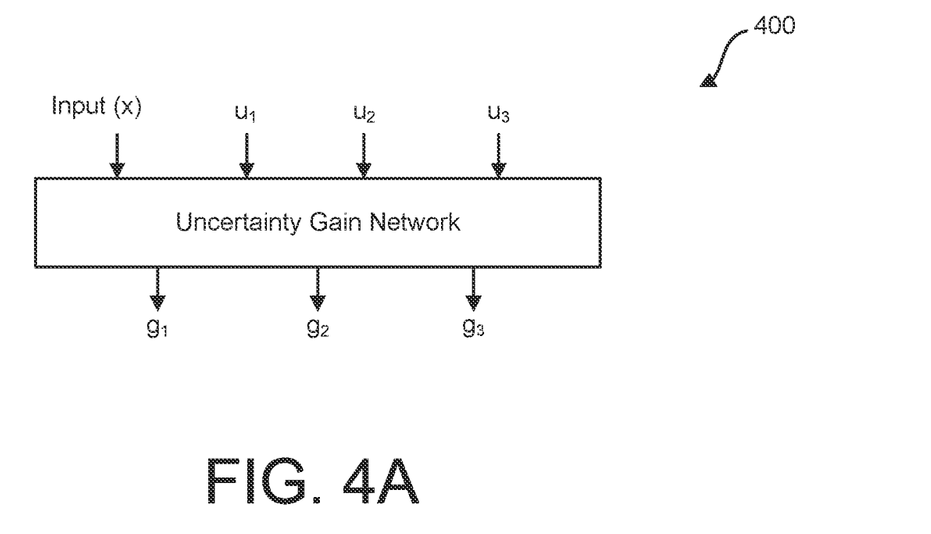
FIG. 4A illustrates an embodiment of an uncertainty gain network.
Figure 4B:
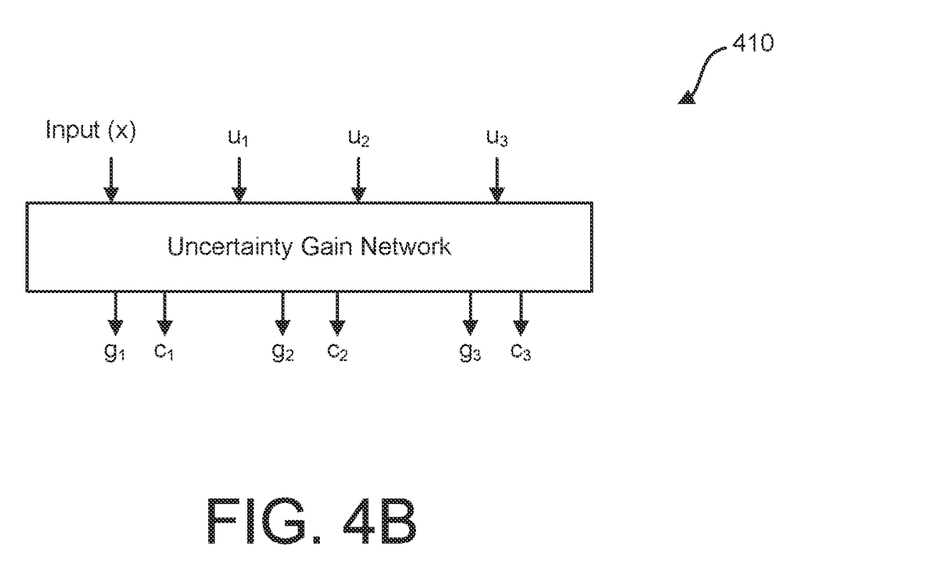
FIG. 4B illustrates another embodiment of an uncertainty gain network.

Some embodiments further include an uncertainty gain network (UGN) 400 shown in FIG. 4A or an uncertainty gain network 410 shown in FIG. 4B. UGN network 400 receives a) the uncertainty associated with each primary network module and b) the network input, x, and generates gains $g_1$ through $g_3$, applied to the output of the auxiliary modules $A_1$, $A_2$, and $A_3$ as shown in FIGS. 3A and 3B. In a similar fashion, UGN network 410 receives a) the uncertainty associated with each primary network module and b) the network input, x, and generates gains $g_1$ through $g_3$, applied to the output of the auxiliary modules $A_1$, $A_2$, and $A_3$ and gains $c_1$ through $c_3$ applied to the output of the primary modules, $M_1$, $M_2$, and $M_3$ as shown in FIG. 3B. In some embodiments, UGN network 400 learns the weighting given to each auxiliary module $A_1$, $A_2$, and $A_3$ in complementing the primary modules $M_1$, $M_2$, and $M_3$. In a similar fashion UGN network 410 learns the weighting given to each auxiliary module $A_1$, $A_2$, and $A_3$ as well as the gains applied to the primary modules $M_1$, $M_2$ and $M_3$ to generate an effective mixture of their corresponding outputs. During inference, for the embodiment of FIG. 3A, when the correction provided by an auxiliary module is needed, the corresponding uncertainty gain $g_i$ (i=1, . . . , 3) will ideally be close to 1 to fully utilize the help provided by the auxiliary unit. However, when a primary module is fully confident in capturing the behavior over the available new training data (i.e., when the new training data provides no new information that is unseen by the module) the uncertainty gain ideally reduces to 0 to null any correction generated by the corresponding auxiliary module.

In the more general embodiment of FIG. 3B, when the correction provided by an auxiliary module is needed, the corresponding uncertainty gain $g_i$ (i=1, . . . , 3) will ideally be close to 1 to fully utilize the help provided by the auxiliary unit and simultaneously the gain $c_i$ (i=1, . . . , 3) is reduced closer 0 to suppress the unreliable output of the corresponding primary module. In larger networks, a complex interplay may exist between the uncertainties of various modules and the input data. UGN networks 400 and 410 aim to track this behavior and generate the uncertainty gains $c_i$ and $g_i$ (i=1, . . . , N). A similar approach can be taken during training where the uncertainty gain is used as part of the back-propagation to the parameters of each auxiliary module. An uncertainty gain of 0 leaves the corresponding parameters intact and an uncertainty gain of 1 adopts a full back-propagation for parameter adjustment of the auxiliary modules. During training, one can apply back-propagation to tune the parameters of both the auxiliary modules and those of UGN networks 400/410. As discussed above, for the second and third sources of network training data, the systems and methods leave the parameters of the primary modules $M_i$ intact. The first source of network training data can be used directly to further train the corresponding primary module in isolation.

In some situations, an approach is taken to quantify the uncertainty associated with each primary module $M_i$. In these situations, the systems and methods model each primary module as a Bayesian network. This is reflected in both the training and the inference stages. In one embodiment of the invention, the Bayesian assumption leads the systems and methods to take a dropout technique during the training. Dropout is an approach that randomly sets the parameters of a network to zero. This helps the generalization capability of the network. The same approach is taken during inference where the network parameters are randomly set to zero. Thus, during inference on a given fixed input, depending on which parameters are randomly set to zero, the network output can vary from one iteration to another. In some embodiments, the systems and methods repeat the inference on a given input several times and draw multiple outputs on a given input. In some implementations, the mean is used as the network output and the variance is used as a measure of network uncertainty.

To normalize the uncertainty measure with respect to a known variance, the systems and methods divide the calculated variance of the network output by the output variance of the training data associated with the primary module under consideration. This is shown in Eq. 1 below.

$$u_i = \gamma_i / \beta \qquad (1)$$

where $\gamma_i$ is the output variance of the Bayesian network, $M_i$, and $\beta$ is the variance of the training data output used to train the corresponding primary module $M_i$. As is shown in FIGS. 3A and 3B, each primary module generates a) an output to the subsequent modules, and b) an uncertainty value, $u_i$. In a general case with N modules, the calculated $u_i$ along with x, the input to the network, are fed into UGN network 400/410 as shown in FIGS. 4A and 4B. In another embodiment, each primary module can utilize an independent UGN network 400/410 with its separate inputs $u_i$ and $x_i$, where $x_i$ is the input to the corresponding primary module. In other embodiments, different variations of UGN networks 400 or 410 placement and input assignment within a given network structure are possible.

Figure 5:
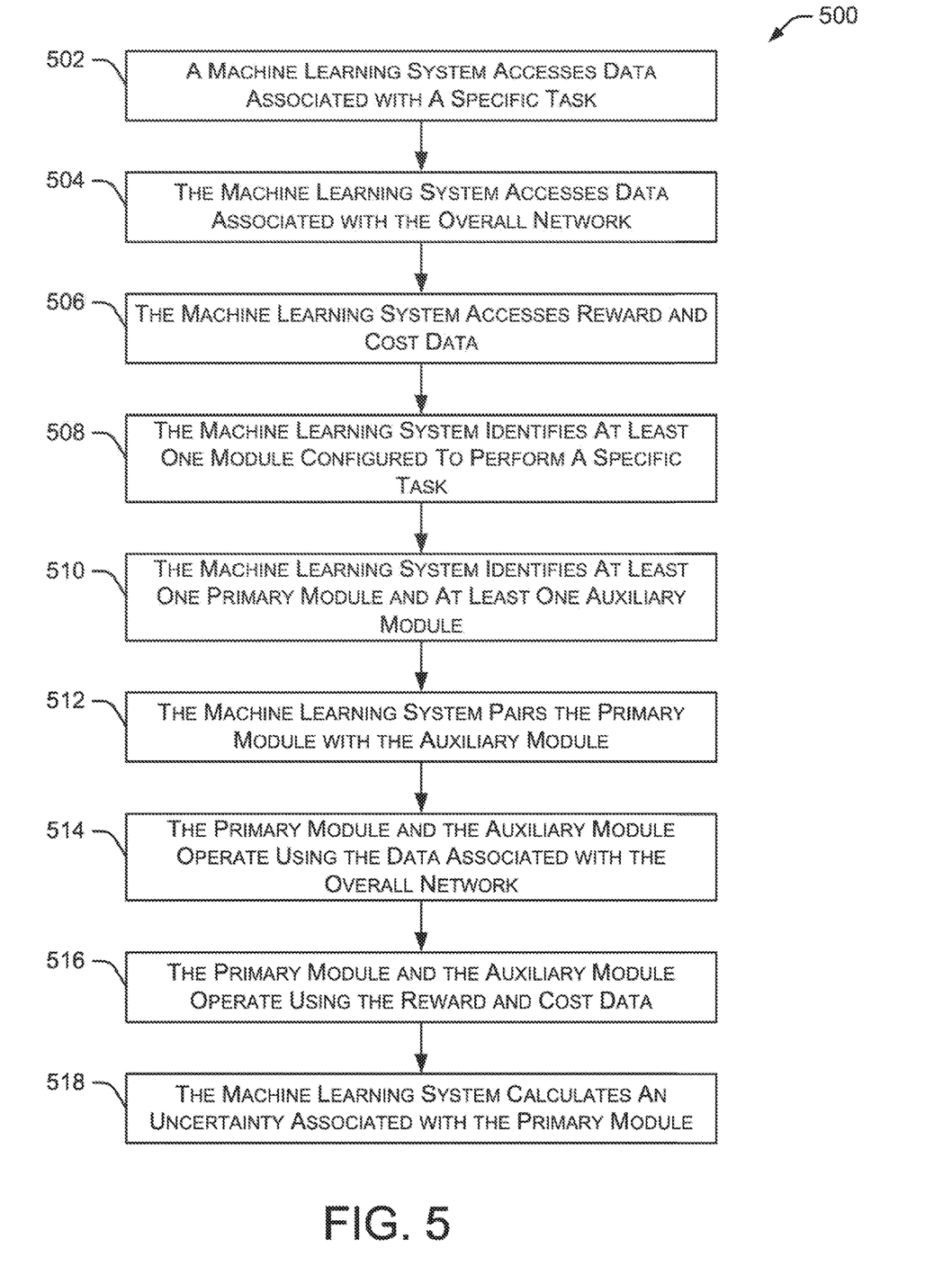
FIG. 5 illustrates an embodiment of a method for operating a machine learning system.

FIG. 5 illustrates an embodiment of a method 500 for operating a machine learning system. Initially, a machine learning system (such as machine learning system 102 shown in FIG. 1) accesses 502 data associated with a specific task. This data may be stored in the machine learning system or in another system accessible by the machine learning system. Method 500 continues as the machine learning system accesses 504 data associated with the overall network and accesses 506 reward and cost data. The machine learning system then identifies 508 at least one module configured to perform a specific task. Additionally, the machine learning system identifies 510 at least one primary module and at least one auxiliary module. In some embodiments, the machine learning system identifies multiple primary modules and multiple auxiliary modules. The primary module is paired 512 with at least one auxiliary module such that the primary module and the auxiliary module operate 514 using the data associated with the overall network. In some embodiments, the primary module and the auxiliary module operate 516 using the data associated with the reward and cost data. The machine learning system further calculates 518 an uncertainty associated with each primary module. In particular implementations, the primary module and the auxiliary module may operate using multiple types of data, such as the data associated with a specific task, the data associated with the overall network, the reward and cost data, and other data types.

Thus, embodiments of the systems and methods described herein enable the use of end-to-end data (or any other type of data) while maintaining the modularity of the system. In particular implementations, the systems and methods calculate an uncertainty value associated with each module which is proportional to each module's confidence over new training data. The uncertainty value is used as an input to readjust module parameters to reduce overall error observed by the network.

Particular embodiments of the described systems and methods may perform one or more different tasks or operations, such as control tasks associated with an autonomous vehicle, a robotic system, and the like.

Figure 6:
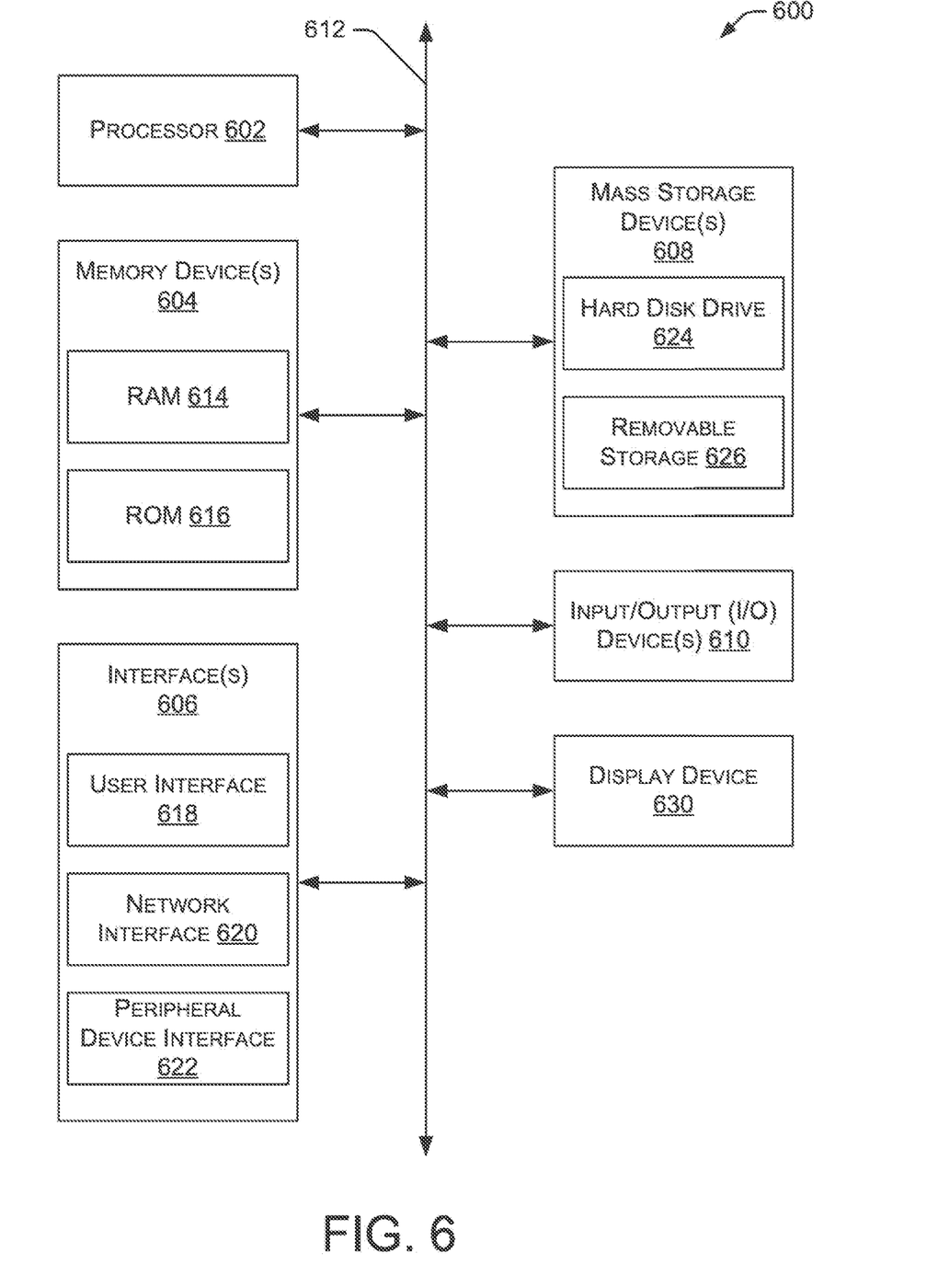
FIG. 6 illustrates an example block diagram of a computing device.

FIG. 6 illustrates an example block diagram of a computing device 600. Computing device 600 may be used to perform various procedures, such as those discussed herein. For example, computing device 600 may perform any of the functions or methods of the machine learning system 102 and/or any other computing entity. Computing device 600 can perform various functions as discussed herein, and can execute one or more application programs, such as the application programs or functionality described herein. Computing device 600 can be any of a wide variety of computing devices, such as a desktop computer, in-dash computer, vehicle control system, a notebook computer, a server computer, a handheld computer, tablet computer, a wearable device, and the like.

Computing device 600 includes one or more processor(s) 602, one or more memory device(s) 604, one or more interface(s) 606, one or more mass storage device(s) 608, one or more Input/Output (I/O) device(s) 610, and a display device 630 all of which are coupled to a bus 612. Processor(s) 602 include one or more processors or controllers that execute instructions stored in memory device(s) 604 and/or mass storage device(s) 608. Processor(s) 602 may also include various types of computer-readable media, such as cache memory.

Memory device(s) 604 include various computer-readable media, such as volatile memory (e.g., random access memory (RAM) 614) and/or nonvolatile memory (e.g., read-only memory (ROM) 616). Memory device(s) 604 may also include rewritable ROM, such as Flash memory.

Mass storage device(s) 608 include various computer readable media, such as magnetic tapes, magnetic disks, optical disks, solid-state memory (e.g., Flash memory), and so forth. As shown in FIG. 6, a particular mass storage device is a hard disk drive 624. Various drives may also be included in mass storage device(s) 608 to enable reading from and/or writing to the various computer readable media. Mass storage device(s) 608 include removable media 626 and/or non-removable media.

I/O device(s) 610 include various devices that allow data and/or other information to be input to or retrieved from computing device 600. Example I/O device(s) 610 include cursor control devices, keyboards, keypads, microphones, monitors or other display devices, speakers, printers, network interface cards, modems, and the like.

Display device 630 includes any type of device capable of displaying information to one or more users of computing device 600. Examples of display device 630 include a monitor, display terminal, video projection device, and the like.

Interface(s) 606 include various interfaces that allow computing device 600 to interact with other systems, devices, or computing environments. Example interface(s) 606 may include any number of different network interfaces 620, such as interfaces to local area networks (LANs), wide area networks (WANs), wireless networks, and the Internet. Other interface(s) include user interface 618 and peripheral device interface 622. The interface(s) 606 may also include one or more user interface elements 618. The interface(s) 606 may also include one or more peripheral interfaces such as interfaces for printers, pointing devices (mice, track pad, or any suitable user interface now known to those of ordinary skill in the field, or later discovered), keyboards, and the like.

Bus 612 allows processor(s) 602, memory device(s) 604, interface(s) 606, mass storage device(s) 608, and I/O device(s) 610 to communicate with one another, as well as other devices or components coupled to bus 612. Bus 612 represents one or more of several types of bus structures, such as a system bus, PCI bus, IEEE bus, USB bus, and so forth.

For purposes of illustration, programs and other executable program components are shown herein as discrete blocks, although it is understood that such programs and components may reside at various times in different storage components of computing device 600, and are executed by processor(s) 602. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

While various embodiments of the present disclosure are described herein, it should be understood that they are presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the described exemplary embodiments, but should be defined only in accordance with the following claims and their equivalents. The description herein is presented for the purposes of illustration and description. It is not intended to be exhaustive or to limit the disclosure to the precise form disclosed. Many modifications and variations are possible in light of the disclosed teaching. Further, it should be noted that any or all of the alternate implementations discussed herein may be used in any combination desired to form additional hybrid implementations of the disclosure.

The invention claimed is:

1. A method comprising:
  accessing, by a machine learning system, data associated with a plurality of tasks;
  accessing, by the machine learning system, data associated with an overall network;
  accessing, by the machine learning system, reward data; and
  the machine learning system operating on the data associated with the plurality of tasks, the data associated with an overall network, and the reward data by:
    training a plurality of task models using the data associated with the plurality of tasks to perform the plurality of tasks;
    providing a plurality of auxiliary task models, each auxiliary models each corresponding to one task model of the plurality of task models;
    providing a primary output model;
    providing a plurality of uncertainty gain networks, each uncertainty gain network of the plurality of uncertainty gain networks having coupled thereto both a task model of the plurality of task models and an auxiliary task model of the plurality of auxiliary task models corresponding to the task model; and
    training the primary output model, auxiliary model, and the plurality of uncertainty gain networks according to the data associated with the overall network and the reward data without training the plurality of task models.

2. The method of claim 1, wherein operating on the data associated with the plurality of tasks, the data associated with an overall network, and the reward data includes performing the plurality of tasks.

3. The method of claim 1, further comprising accessing cost data.

4. The method of claim 3, wherein the machine learning system further operates on the cost data.

5. The method of claim 1, wherein operating on the data associated with a particular task, the data associated with an overall network, and the reward data includes performing a control operation.

6. The method of claim 5, wherein the control operation is an operation associated with an autonomous vehicle.

7. The method of claim 5, wherein the control operation is an operation associated with a robotic system configured to assemble or transport items.

8. The method of claim 1, further comprising accessing data associated with a plurality of different tasks.

9. The method of claim 8, wherein the machine learning system further operates a plurality of modules, where each of the plurality of modules is associated with one of the plurality of different tasks.

10. A machine learning system comprising:
  a processor; and
  a memory device coupled to the processor, the memory device configured to store instructions for execution on the processor, the instructions causing the processor to:
  access data associated with a plurality of tasks;
  access data associated with an overall network;
  access reward data; and
  operate on the data associated with the plurality of tasks, the data associated with an overall network, and the reward data by:
    training a plurality of task models using the data associated with the plurality of tasks to perform the plurality of tasks;
    providing a plurality of auxiliary task models, each auxiliary models each corresponding to one task model of the plurality of task models;
    providing a primary output model;
    providing a plurality of uncertainty gain networks, each uncertainty gain network of the plurality of uncertainty gain networks having coupled thereto both a task model of the plurality of task models and an auxiliary task model of the plurality of auxiliary task models corresponding to the task model; and
    training the primary output model, auxiliary model, and the plurality of uncertainty gain networks according to the data associated with the overall network and the reward data without training the plurality of task models.

11. The machine learning system of claim 10, wherein the instructions further cause the processor to access cost data and operate on the cost data to perform the plurality of tasks.

12. The machine learning system of claim 10, wherein operating on the data associated with the plurality of tasks, the data associated with an overall network, and the reward data includes performing a control operation.

13. The machine learning system of claim 12, wherein the control operation is an operation associated with an autonomous vehicle.

14. The machine learning system of claim 12, wherein the control operation is an operation associated with a robotic system configured to assemble or transport items.

* * * * *